US012792884B2

(12) United States Patent
Binkley et al.

(10) Patent No.: US 12,792,884 B2
(45) Date of Patent: Nov. 10, 2026

(54) UNSUPERVISED PATTERN DISCOVERY USING DYNAMIC GRAPH EMBEDDINGS

(71) Applicant: Raytheon Company, Arlington, VA (US)

(72) Inventors: Joshua A. Binkley, Richardson, TX (US); Christine R. Nezda, Richardson, TX (US); Marta Tatu, Murphy, TX (US)

(73) Assignee: Raytheon Company, Arlington, VA (US)

( * ) Notice: Subject to any disclaimer, the term of this patent is extended or adjusted under 35 U.S.C. 154(b) by 744 days.

(21) Appl. No.: 18/133,755

(22) Filed: Apr. 12, 2023

(65) Prior Publication Data

US 2023/0334295 A1 Oct. 19, 2023

Related U.S. Application Data

(60) Provisional application No. 63/330,510, filed on Apr. 13, 2022.

(51) Int. Cl.
*G06N 3/0455* (2023.01)
*G06F 18/2321* (2023.01)
*G06N 3/088* (2023.01)

(52) U.S. Cl.
CPC ....... *G06N 3/0455* (2023.01); *G06F 18/2321* (2023.01); *G06N 3/088* (2013.01)

(58) Field of Classification Search
CPC ...... G06N 3/0455; G06N 3/088; G06N 3/047; G06N 5/02; G06F 18/2321
See application file for complete search history.

(56) References Cited

U.S. PATENT DOCUMENTS

| | | | | |
|---|---|---|---|---|
| 11,455,512 | B1 * | 9/2022 | Al-Rfou' | G06N 3/04 |
| 2020/0342006 | A1 * | 10/2020 | Rossi | G06F 16/285 |
| 2023/0049817 | A1 * | 2/2023 | Shi | G06N 3/08 |

* cited by examiner

*Primary Examiner* — Casey R. Garner
(74) *Attorney, Agent, or Firm* — Schwegman Lundberg & Woessner, P.A.

(57) ABSTRACT

Discussed herein are devices, systems, and methods for unsupervised pattern discovery using continuous-time dynamic graphs. A method can include receiving, from a graph neural network (GNN), source node embeddings and destination node embeddings, clustering the destination node embeddings generated by the GNN resulting in first groups of destination node embeddings, removing, from the destination node embeddings, embeddings from a noise group of the first groups resulting in signal destination node embeddings, clustering the signal destination node embeddings resulting in second groups of destination node embeddings, and identifying a pattern in the destination node embeddings and source node embeddings based on the second groups of destination node embeddings, the source node embeddings, and the destination node embeddings.

17 Claims, 7 Drawing Sheets

UNSUPERVISED PATTERN DISCOVERY USING DYNAMIC GRAPH EMBEDDINGS

CLAIM OF PRIORITY

This application claims the benefit of priority to U.S. provisional patent application No. 63/330,510, which was filed on Apr. 13, 2022, titled "System for Unsupervised Pattern Discovery Using Continuous-Time Dynamic Graph Embeddings", and is incorporated herein by reference in its entirety.

TECHNICAL FIELD

Embodiments generally regard pattern discovery using a graph embedding technology, such as a graph neural network (GNN). A GNN is a neural network technology which can produce node embeddings when applied to graph data of a dynamic graph.

BACKGROUND

Machine Learning (ML) technologies can operate to identify patterns based on graph data. These ML technologies are undergoing a shift in predictive capabilities that has provided new algorithms that can process embeddings from continuous-time dynamic graphs (CTDGs). CTDGs are graph representations that are suited to graphs where updates to nodes and edges are frequent and asynchronous as in the case of the Automatic Identification System (AIS) and Internet of Things (IoT) data. Technologies at the forefront of this change include Jodie, temporal graph attention (TGAT), and most recently temporal graph network (TGN). These technologies provide a framework for constructing time-aware graph embeddings for downstream link prediction and classification tasks.

One major problem with these technologies is graph data sets where the performance metrics from the learner seem to suggest high quality inference, while the embeddings themselves do not have an actionable semantic when an output is provided. This is in contrast to, for example, word embeddings where semantically similar words are expected to be near each other in the embedded space. In order to use CTDG embeddings to inform a real-world decision process, they need to be decoded into interpretable information. The graph embeddings produced by TGN, for example, are split into large vectors for source and destination nodes in the bipartite settings between source and destination, but the embeddings in the vector space represent complex compound phenomena in the data, and different patterns of phenomena in the data will produce different distributions of embeddings in the vector space.

DETAILED DESCRIPTION

Figure 1:
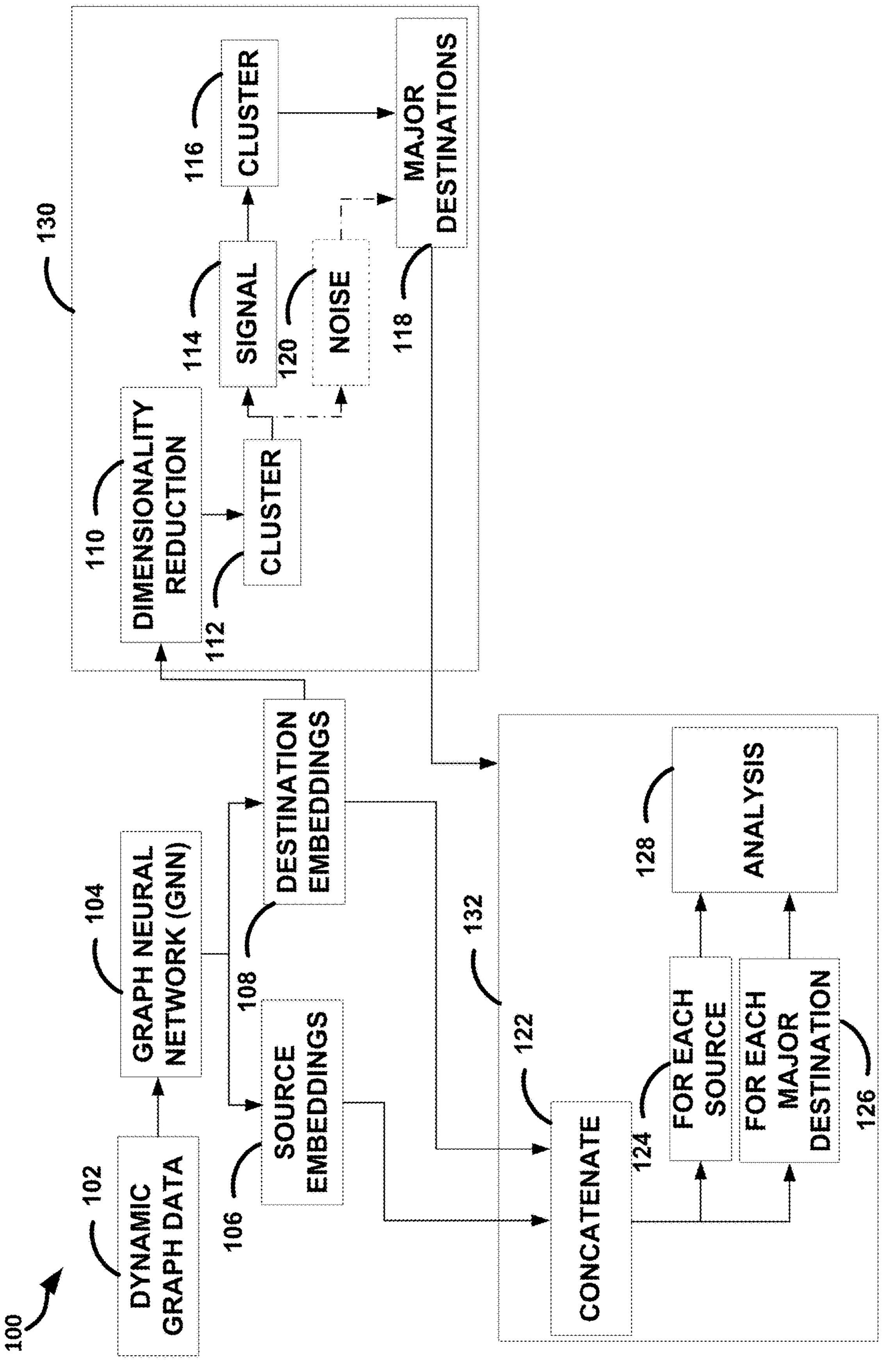
FIG. 1 illustrates, by way of example, a block diagram of an embodiment of a method for unsupervised pattern discovery using CTDG embeddings.

Embodiments leverage the expressive power of dynamic graph embedding techniques to discover actionable patterns between source and destination nodes without supervision (in an unsupervised manner). The source nodes can represent entities and are sometimes called "entity nodes". The destination nodes can represent locations and are sometimes called "location nodes". The source and destination nodes can represent other items than respective entities and respective destinations (or vice versa), respectively, and embodiments are not limited to such a representation.

A general approach to this type of pattern discovery is clustering. The clustering can be with neural networks (NN), such as autoencoders, or other means such as density-based spatial clustering of applications with noise (DBSCAN), a Gaussian mixture model (GMM), agglomerative clustering, or the like. However, any such unsupervised abstraction on data in the embedded space lacks the ability to describe the patterns of one node type in terms of the other in a meaningful way for the simple reason that the embedded input space itself is not interpretable. Further, models like TGN for producing the embeddings are not invertible to construct an architecturally symmetric decoder from the raw features (they comprise memory mechanisms, complex aggregation functions, and other non-invertible modules).

At a high level, embodiments are perhaps best compared to Markov chains and related algorithms (e.g., hidden Markov models (HMIs) and Markov networks) that have been in wide use for decades. This is because the Markov chains and related algorithms are ultimately deriving a probabilistic summary of source and destination node states.

To understand and overcome the problems mentioned, a series of exploratory experiments for decoding data with known types of patterns were constructed. Embodiments leverage findings from those experiments to build an integrated ML pipeline for continuous time dynamic graph (CTDG) data with unknown types of patterns. The input data to this system is a CTDG. The CTDG comprises a number of edges between source and destination nodes, edge identifiers, as well as a feature set including a known 'natural space' of the nodes, all of which can evolve through time via add/remove/update operations. When nodes are entities or locations, the features comprising the natural space can include x/y or lat/lon for geospatial data. The pipeline can then be summarized as: 1) Construct source and destination embeddings of the CTDG data (e.g., using TGN or other GNN), and also the concatenation of source and destination embeddings within each update to the graph. 2) Apply a clustering technique to the destination embeddings or a projection of those embeddings such that two clusters emerge, noise and signal clusters; choose the least dense cluster to represent the signal, and the other cluster to represent noise; process the signal cluster in its natural space with a subsequent round of clustering into major destination clusters. 3) For each source node identifier (e.g., a particular entity), aggregate its concatenated temporal embeddings and a series of semantic divisions to act as a prior on the semantic partitions of a step in a semantically meaningful pattern of life (e.g., the expected temporal divisions of steps in an activity loop such as home/work/home for an entity). For each source identifier/semantic division, construct a classifier to predict the temporal division based on the concatenated embedding. This will produce a mapping from embeddings to expected semantic states. Across these states, compute the probability of a destination node given the concatenated embedding and classifier output. Apply the same steps for each destination node identifier. The output of this system is a summary of states learned by the GNN that produced the embeddings—it can also be applied to summarize what the model has learned from the training data, or to transform new data into information about the pattern it is exhibiting. The states may be related to temporal partitions (although other partitions, such as speed or heading for geospatial data may also be applied, time partitions are used in some embodiments as a time field is guaranteed in a CTDG setting), and they are amenable to metrics describing the coherence of patterns with respect to each source and destination node (given in more detail elsewhere), as well as the details of individual patterns for each node in terms of its adjacent node type. For instance, in embodiments, a summary of which locations an entity is likely to associate with given its embedding, which entities are likely to be associated with a location cluster given its embedding, as well as metrics on a confidence that those patterns will be adhered to within semantic divisions can be provided as output. These are generally aggregations regarding the distribution of entities and locations within and across partitions, as well as classifier confidences for the same.

There are at least three major advantages of embodiments over prior algorithms discussed above: 1) embodiments, by leveraging time-aware embeddings encoding information across time, capture longer-term pattern dependencies. This is different from a Markov process which makes a conditional independence assumption on the previous timestep. 2) The embeddings of embodiments capture properties of both nodes and edges driven by the features the user provides, as well as the local structure of the graph, and 3) embodiments leverage embeddings to infer the "state space" (e.g., specific temporally sensitive contexts of entity and/or major location in embodiments) that should be considered without the need for providing this data up-front or learning it in a supervised fashion.

FIG. 1 illustrates, by way of example, a block diagram of an embodiment of a method 100 for unsupervised pattern discovery using CTDG embeddings. CTDG embeddings are embeddings produced by a dynamic graph. The method 100 includes receiving dynamic graph data 102. The dynamic graph data 102 is data that describes nodes and their associations with each other. In an example in which the nodes represent entities and locations, the dynamic graph data 102 can indicate locations of entities, whether entities interacted with each other and when, properties of entities and locations that may change over time, or the like. The dynamic graph data 102 can be used to train the GNN 104. The dynamic graph data 102 can represent interactions or operations of a social network, intelligence data, consumer data, or the like.

A GNN 104 can produce, based on the dynamic graph data 102, source embeddings 106 and destination embeddings 108 from, for example, a bipartite graph structure. The source embeddings 106 encode the state of a source node based on edges that have a terminus at the source node and an opposing terminus at a destination node. The destination embeddings 106 can encode the state of a destination node based on edges that have a terminus at the destination node and an opposing terminus at a source node. The edges indicate interaction between nodes and a time associated with a given edge indicates the time of the interaction or the time at which the interaction was observed or recorded.

The embeddings 106, 108 can be constructed using a variety of GNN 104 techniques. The GNN 104 can include TGN, Jodie, TGAT, DyRep, or other GNN that processes dynamic graph data into source and destination embeddings. Both the source and destination embeddings 106, 108 can be used in a pattern determination operation 132. The destination embeddings 108 can be used in a two-step clustering operation 130 to identify significant destinations.

The clustering operation 130 can perform dimensionality reduction 110 on the destination embeddings 108. Dimensionality reduction can help separate signal data from noise data. In the context of entities and locations, noise represents transient locations and signal represents longer duration at a location. The dimensionality reduction can include any of a variety of dimensionality reduction techniques. Example dimensionality reduction techniques can include principal component analysis (PCA), missing value ratio, low variance filter, high correlation filter, random forest, backward feature elimination, forward feature selection, factor analysis, independent component analysis, methods based on projections, t-distributed stochastic neighbor embedding (t-SNE), uniform manifold approximation and projection (UMAP), self-organizing maps (SOM) and other neural network based techniques such as autoencoders, among others.

Dimensionally reduced destination embeddings (output of the dimensionality reduction 110) can be input to a clustering technique 112. Note the dimensionality reduction 110 produces an artifact (seen in FIG. 2) that clearly partitions the signal data from the noise. Using a clustering technique 112 that groups unlabeled examples by similarity, the noise cluster can be identified and removed from the destination data. The similarity can be determined based on a similarity measure. The similarity can include a Euclidean distance, L2 norm, L1 norm, City Block distance, Manhattan distance, Canberra distance, Chebyshev distance, maximum distance, Minkowski distance, cosine similarity, Pearson correlation, Spearman correlation, Mahalanobis distance, Chi-square distance, standardized Euclidean distance, Jensen-Shannon distance, Levenshtein distance, Jaccard distance, or Hamming distance, among others. Example clustering techniques 112 include k-means clustering, mini-batch k-means clustering, density-based spatial clustering of applications with noise (DB SCAN), a Gaussian mixture model, balanced iterative reducing and clustering using hierarchies (BIRCH), affinity propagation, ordering points to identify the clustering structure (OPTICS), mean-shift, agglomerative hierarchical clustering, divisive hierarchical clustering, or spectral clustering.

The clustering technique 112 can separate inputs (destination embedding representations that have been dimensionally reduced) into one or more signal clusters 114 and a noise cluster 120 (e.g., a single noise cluster). Determining which clusters are signal and which are noise can include comparing an average distance between points in a cluster to a threshold. The smaller the average distance, the more likely the cluster is a noise cluster 120.

Figure 2:
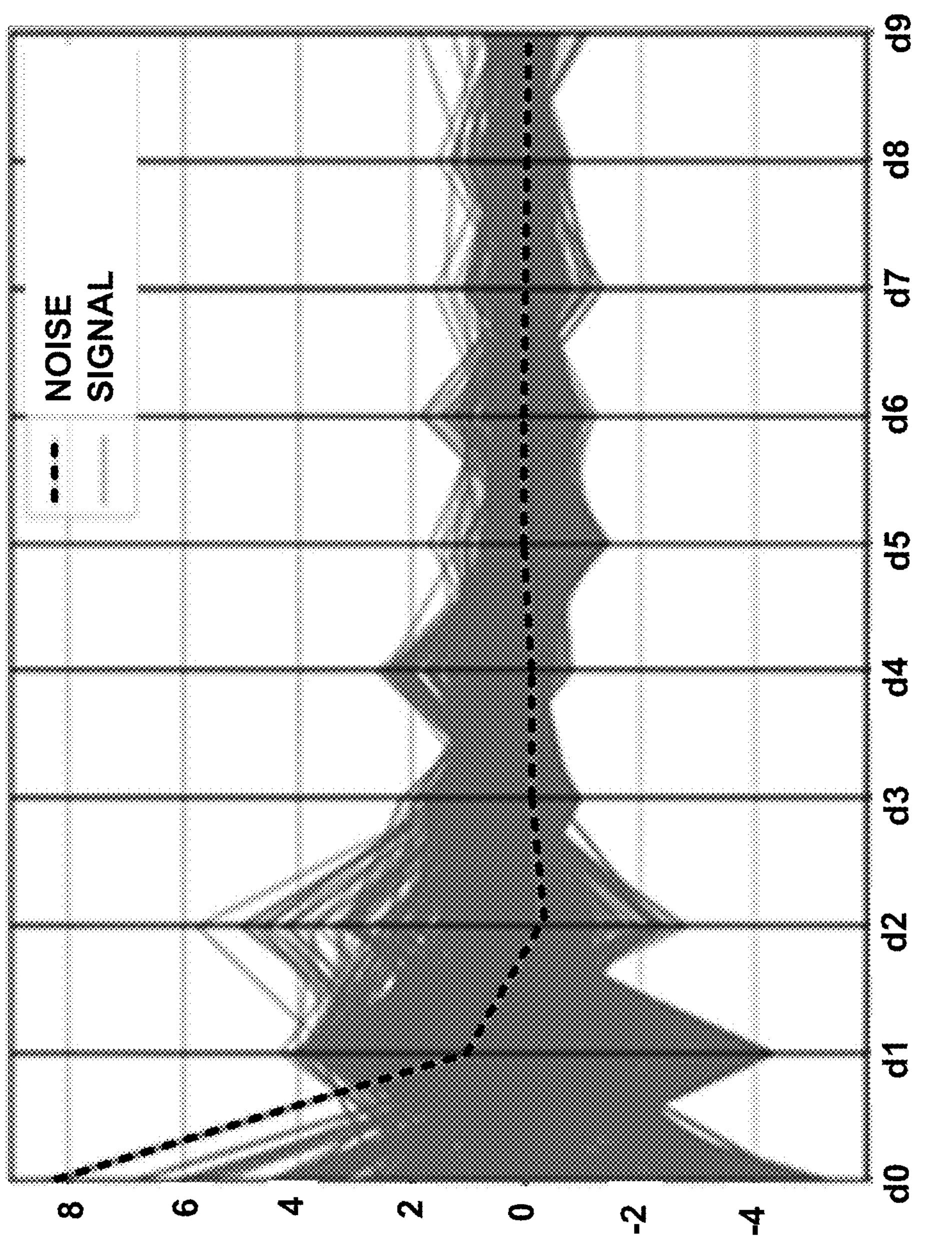
FIG. 2 illustrates, by way of example, a parallel coordinates plot of average deviation per dimension for noise and signal clusters.

FIG. 2 illustrates, by way of example, a parallel coordinates plot of average deviation per dimension for noise and signal clusters. As is seen, the noise cluster has a much smaller average deviation between items in the cluster than there is deviation between items in the signal cluster(s).

Returning to FIG. 1, the embeddings mapped to a signal cluster 114 can be subject of a subsequent round of clustering without the embeddings mapped to a noise cluster 120. That is, the embeddings mapped to a noise cluster 120 can be removed from the destination embeddings (e.g., that are dimensionally reduced as the operation 110 is operation). Removing the embeddings mapped to the noise cluster 120 leaves embeddings that have been mapped to the signal cluster 114.

The subsequent round of clustering can be performed using a clustering technique 116. The clustering technique 116 can be the same clustering technique or a different clustering technique than the clustering technique 112. The clustering technique 116 can change the members of groups, change the number of groups, or the like. The groups produced by the clustering technique 116 can generate major destinations 118. Each of the groups in the major destinations 118 can be associated with a unique cluster identifier, such as for downstream processing. The operation 130 can be performed without re-clustering by the clustering technique 116. The clustering technique 116 improved destination pattern coherence by greater than 5%. That is, signal cluster 114 and noise cluster 120 separation in this experiment improved performance by a statistically significant amount. The improvement will vary by data set.

A pattern determination operation 132 can include concatenating 122 source embeddings 106 and destination embeddings. Concatenating means to generate a single vector that includes both the source embeddings 106 and the destination embeddings 108. The concatenated embeddings can be used for identifying patterns in the source and destination embeddings.

The concatenated embeddings can be provided along with a source node identifier and major location identifier to an analysis operation 128. A user can select a way to partition the data, such as by time, location, association with a source or major destination or the like. The analysis operation 128 can include using a trained classifier, such as a decoder, to classify the concatenated embeddings. The analysis operation 128 can be performed per source node 124 or per major destination node 126. For example, if the source embeddings 106 represent entities and the destination embeddings 108 represent locations, the analysis operation 128 can determine the probability of the entity being at each location during a specified time period or a probability that location would contain an entity at a given time.

Table 1 provides an example output for items represented by source nodes being associated with a destination node:

TABLE 1 output of analysis determining probability of a source being associated with each destination ordered from highest to lowest (left to right), where each row represents a different source node. Note probability across rows add to unity in this example as entities can only appear at one location at a time (hence probabilities sum to one.

| | | | |
|---|---|---|---|
| (dest_0, prob_0) | (dest_1, prob_1) | . . . | (dest_N, prob_N) |
| (dest_5, prob_N + 1) | (dest_N − 1, prob_N + 2) | . . . | (dest_7, prob_2N) |
| . . . | . . . | . . . | . . . |
| (dest_7, prob_M − N) | (dest_9, prob_M − N + 1) | . . . | (dest_0, prob_M) |

In the example of Table 1, the analysis operation 128 was tasked with determining whether an entity, for example, is at a given location given its location pattern and neighbors (node neighbors) in the graph data 102.

Table 2 provides an example output for items represented by major destination nodes being associated with a source node:

TABLE 2 output of analysis determining probability of a destination being associated with a source ordered from highest to lowest probability (left to right), where each row represents values for a different destination node. Note probability across rows do not necessarily add to unity in Table 2. This is because a major destination can have more than one entity located there. In the bipartite setting, if the node types constitute an injective mapping (as in the case of major location→entity), the probabilities may sum to unity. In the case where the relation between node types is many-to-one (as in the case of entity→major location) or many-to-many, the probabilities may not sum to unity.

| | | | |
|---|---|---|---|
| (src_0, prob_0) | (src_1, prob_1) | . . . | (src_N, prob_N) |
| (src_5, prob_N + 1) | (src_N-1, prob_N + 2) | . . . | (src_7, prob_2N) |
| . . . | . . . | . . . | . . . |
| (src_7, prob_M − N) | (src_9, prob_M − N + 1) | . . . | (src_0, prob_M) |

In the Example of Table 2, the analysis operation 128 was tasked with determining whether entities at a location were expected to be at the location.

Figure 3:
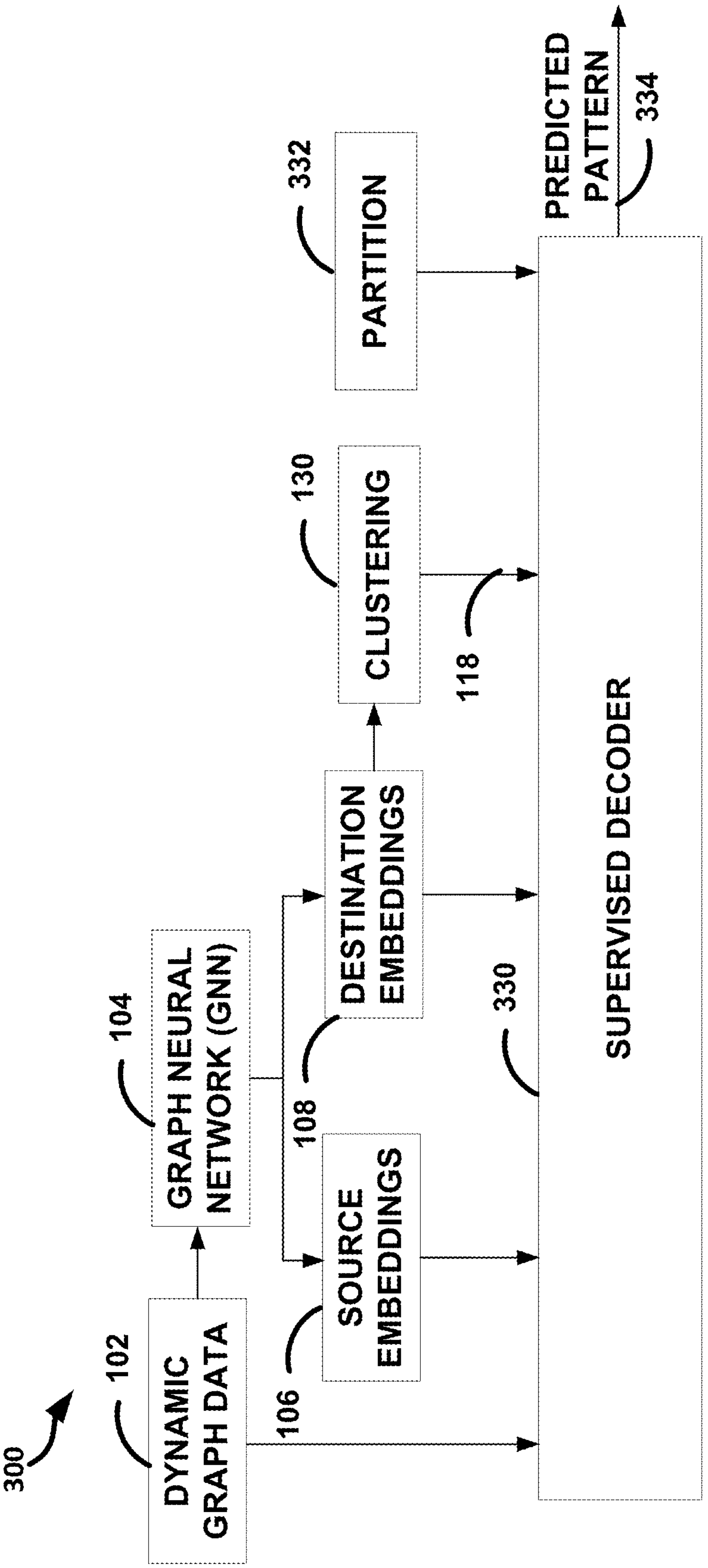
FIG. 3 illustrate, by way of example, a diagram of an embodiment of a system that includes supervised decoder to perform an analysis operation.

FIG. 3 illustrate, by way of example, a diagram of an embodiment of a system 300 that includes supervised decoder 330 to perform the analysis operation 128. Similar to FIG. 1, the system 300 receives dynamic graph data 102. The GNN 104 generates source embeddings 106 and destination embeddings 108 based on the dynamic graph data 102. The destination embeddings 108 are operated on by clustering operation 130 to determine major locations. A user or default partition data 332 can be provided. The partition data 332 can indicate how to organize a predicted pattern 334, such as by time, kinematic properties for movers, or more generally any feature or combination of features for source nodes 124 and destination nodes 126 where the partitions may be of use for the analysis 128. For example, an end user would be able to act on the information, such as the example below with time partitions, or the like. The dynamic graph data 102, source embeddings 106, destination embeddings 108, major locations, and partition data 332 can be provided to a supervised decoder 330.

The supervised decoder 330 can be trained in a supervised manner to identify the predicted pattern 334 based on the input data. The supervised decoder 330 can include an NN, linear discriminant analysis (LDA), random forest classifier, or the like. The supervised decoder 330 can generate output, such as in the form of Table 1 or Table 2, for example.

As an example, one might train the supervised decoder 330 to predict a time partition from an embedding for src_0. That will give a model that attempts to learn the relationship between an embedding and a span of time, such as "John is always at these locations between midnight and 3 AM". When the analysis operation 128 is applied after training, if it learns a strong pattern for the hours of midnight and 3 am, that would be apparent as a high probability of, say dest_0 in the first cell, leading to a conclusion whether or not the timestamp on the embedding is between 3 and 6 pm, John is expected to be at dest_0. One could also look at the probability Table 1 for John and gain an understanding of when his day-to-day patterns are more or less predictable.

Similarly for locations, one might train the supervised decoder 330 to map embeddings for a particular location to a time partition. Strong patterns (e.g., a location with a consistent membership during a span of time) will appear as multiple high probabilities in the row corresponding to that span of time. From there, one can dive in further to determine 'regulars' at a location for those spans of time and determine the expected proportions of different groups of entities that would be expected at the location during a period of time given the embedding of the location. If, for example, the supervised decoder 330 looked at the embedding of a location at 10 PM and it matched the expected profile at 11 AM, but not 10 PM, that would be an indicator of activity of interest taking place at the location (e.g., the location at 10 PM unexpectedly looks like it regularly would around 11 AM indicating an event or something abnormal).

Embodiments can be used to determine coherence between source and destination distributions. The analysis 128 can include determination of probabilities, entropies, or the like of an item associated with a node (e.g., source node or destination node). Embodiments can be used to determine predictability of an item associated with a node, similar patterns between items associated with nodes, outlier items, or the like. Embodiments can be used to characterize for patterns of life, such as by aggregation of outputs.

The analysis 128 can leverage a classifier for each entity and location to determine its pattern coherence. High performance in classification 330 of an entity indicates that its location can be inferred from its embedding with high confidence. For instance, when the user partition is time, one can infer whether the entity exhibits a strong pattern of locations through time. If the entity partition was speed, that would indicate that each entity generally kept to certain speeds at certain locations (e.g., similarly the entity exhibits a strong pattern of locations with respect to speeds rather than with respect to time). In this case the pattern is not through time divisions, but through speed divisions.

To help understand GNNs and CTDGs, an example of such technology is described. Machine learning (ML) using dynamic graphs can identify patterns and predict interactions between entities with a broad array of applications. Current applications of dynamic graphs include social networking modeling and predictions, such as predicting whether a user will interact with a tweet or re-tweet.

One example of a dynamic graph machine learning capability is a TGN. The TGN models relationships that change over time. TGN graphs identify patterns of activity in relationships that evolve and change over time, including normal and abnormal behavioral patterns of life (POL). Many real-world scenarios are well matched to dynamic graphs, in which entities are modeled as nodes, and relationships between entities as edges. ML on dynamic graphs, in order to predict future nodes and edges, for instance, is an active area of current research with application to a broad array of problems. For example, embodiments are presented by explaining how ML, using dynamic graphs, can be used on Automatic Identification System (AIS) ship tracking data to identify vessel POL. Other applications of dynamic graphs include entity co-location and co-travel, such as can include detecting co-movements and swarm behaviors, predicting movement along and between lines of communication, drone tracking, detection of violations or suspicious activity, cyber alerting—cluster and detect anomalies in patterns of network activity, among others.

Figure 4:
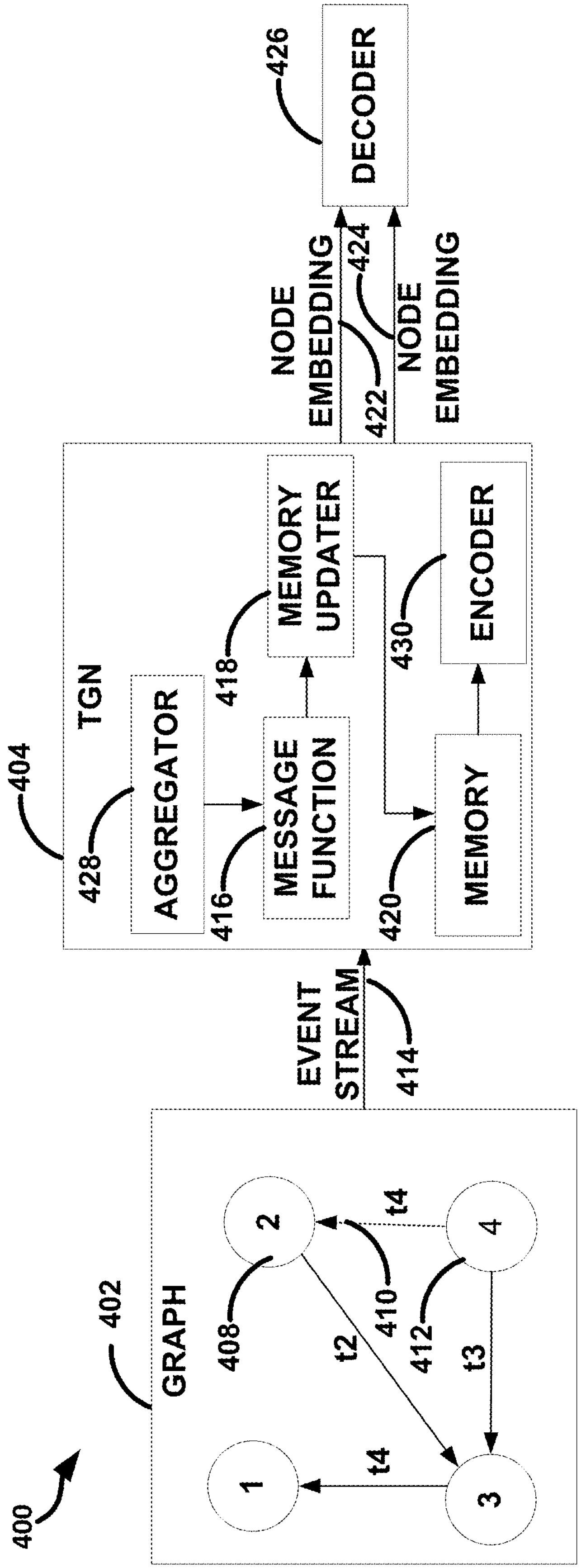
FIG. 4 illustrates, by way of example, a flow diagram of a system for traditional TGN operation.

FIG. 4 illustrates, by way of example, a flow diagram of a system 400 for traditional TGN operation. While TGN is discussed regarding FIG. 4 any GNN For CTDG, such as DTDG, can be used. The system 400 includes a dynamic graph 402, a TGN 404, and a decoder 406. The dynamic graph 402 comprises nodes 408, 412 (not all nodes are labeled) and edges 410 (not all edges are labeled). The nodes 408, 412 represent an entity and the edges 410 represent interaction between corresponding entities on ends of the edges 410. The dynamic graph 402 can be represented as an ordered list or an asynchronous stream 414 of temporal events, such as additions or deletions of nodes 408, 412 and edges 410. In the context of a social networks, when an entity joins the platform, a new node can be created in the dynamic graph 402. When that entity follows another entity, an edge can be created that begins at the following entity and ends at the followed entity. When the entity changes their profile on the social network, the node for that entity can be updated.

Each event of the event stream 414 indicates nodes 408, 412, an edge 410, and a time. The event stream 414 is temporally sequenced such that the TGN 404 receives events with an earlier associated time before events with a later associated time. The event stream 414 is ingested by the TGN 404. The TGN 404 includes an encoder 430 neural network (NN) that produces a time-dependent embedding 422, 424 (one for each source node and one for each destination node) for each node 408, 412 of the graph 402. The embedding 422, 424 can then be fed into a decoder 426 that is designed and trained to perform a specific task. One example task is predicting future interactions between entities represented by the nodes 408, 412. For example, the decoder 426 can predict a likelihood that the entity associated with the node 412 will interact with the entity associated with the node 408 at or by a time, t4. The prediction is indicated as a dashed-line edge 410. The embeddings 422, 424 can be concatenated and fed to the decoder 426.

The TGN 404 can be trained with one or more different decoders 426. The TGN 404 includes an aggregator 428, a message function 416, a memory updater 418, a memory 420, and an encoder 430. The memory 420 stores the states of all the nodes 408, 412 of the graph 402. The one or more entries in the memory 420 corresponding to a given node 408, 412 act as a representation of the past interactions of the given node 408, 412. For each node 408, 412 there is a separate state vector $s_i(t)$ for each node i at time t. When a new node 408, 412 appears, a corresponding state initialized as a vector of zeros can be added to the memory 420. Moreover, since the memory 420 for each node 408, 412 is a memory state vector (MSV) (and not a learned parameter), the MSV can be updated at test time when the model ingests a new interaction.

The message function 416 is a mechanism of updating the memory 420. Given an interaction between nodes 408 and 412 at time t, the message function 416 computes two messages (one for node 408 and one for node 412). The messages are state vectors used to update the memory 420. The message is a function of the memory 420 of nodes 408 and 412 at an instance of time, $t^-$, immediately preceding the interaction between the nodes 408 and 412, the interaction time t, and edge features (if there are any). An aggregator 428 can batch messages and provide the batched messages to the message function 416.

The memory updater 418 is used to update the memory 420 with the messages (e.g., batched messages) from the message function 416. The memory updater 418 can be implemented using a recurrent NN (RNN). Given that the one or more entries in the memory 420 corresponding to a node 408, 412 is a vector updated over time, the vector can become stale or be out of date. To avoid this the memory updater 418 computes the temporal embedding of a node 408, 412 by performing a graph aggregation over the spatio-temporal neighbors of that node 408, 412. Even if the node 408, 412 has been inactive for a while, it is likely that some of its neighboring nodes have been active. By aggregating the entries in the memory 420 of the node 408, 412 and its spatio-temporal node neighbors, TGN can compute an up-to-date embedding for the node 408, 412. A graph attention technique can be used to determine which neighbors are most important to a given node 408, 412 based on the memory 420.

The edge 410 of the graph 402 is represented using full edge features passed to the TGN 404. Embeddings for the full edge features are encoded by the TGN 404 and stored as features of the edge 410. The decoder 406 operates on the embeddings to predict a future event.

Figure 5:
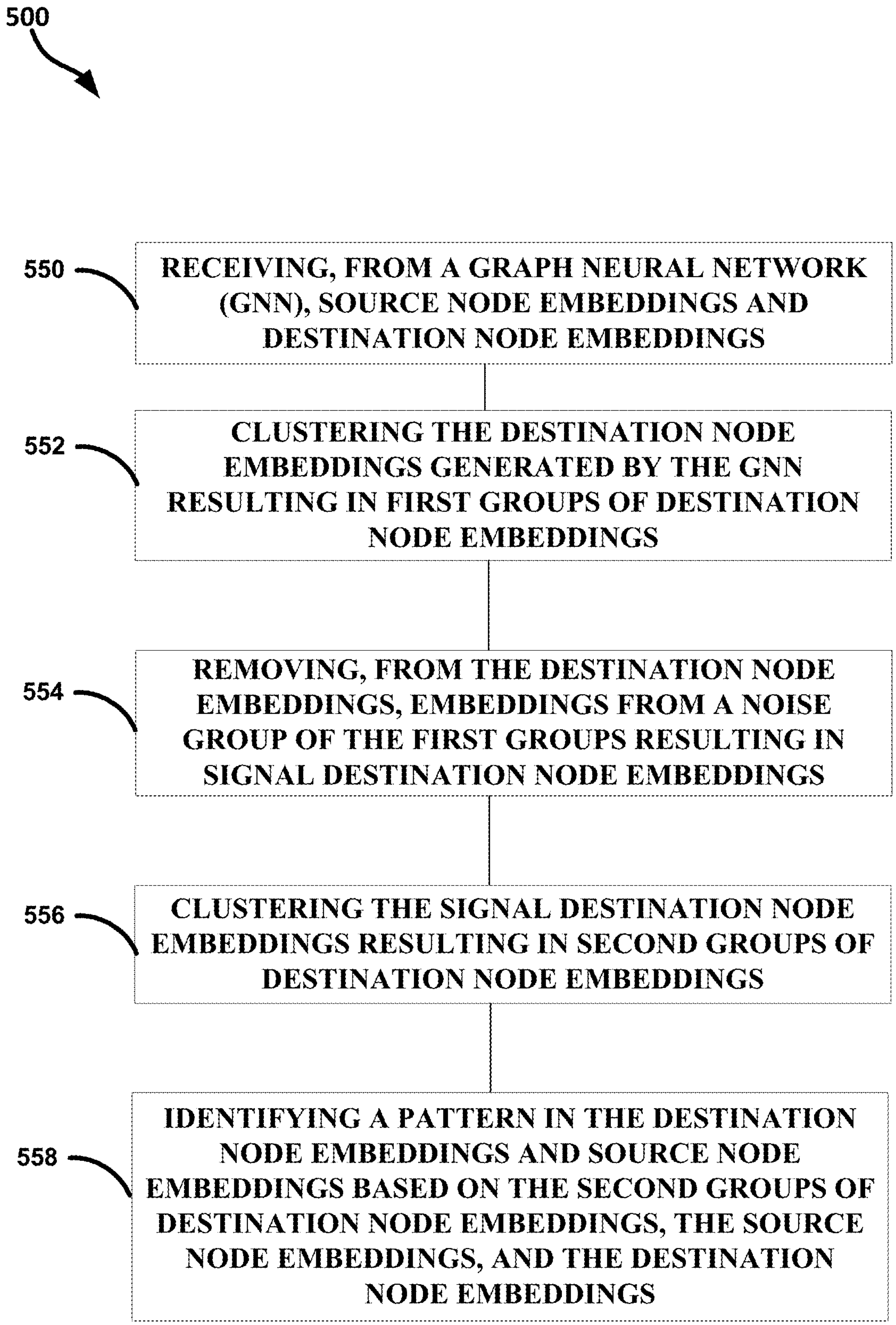
FIG. 5 illustrates, by way of example, a diagram of an embodiment of a method for unsupervised pattern discovery using dynamic graph embeddings.

FIG. 5 illustrates, by way of example, a diagram of an embodiment of a method 500 for unsupervised pattern discovery using a CTDG. The method 500 as illustrated includes receiving, from a graph neural network (GNN), source node embeddings and destination node embeddings, at operation 550; clustering the destination node embeddings generated by the GNN resulting in first groups of destination node embeddings, at operation 552; removing, from the destination node embeddings, embeddings from a noise group of the first groups resulting in signal destination node embeddings, at operation 554; clustering the signal destination node embeddings resulting in second groups of destination node embeddings, at operation 556; and identifying a pattern in the destination node embeddings and source node embeddings based on the second groups of destination node embeddings, the source node embeddings, and the destination node embeddings, at operation 558.

The method 500 can further include reducing dimensionality of the destination node embeddings before clustering the destination node embeddings. The method 500 can further include, wherein removing embeddings from the noise group of the first groups includes identifying a group of the first groups with an average deviation that satisfies a specified criterion. The method 500 can further include concatenating respective source node embeddings and respective destination node embeddings resulting in concatenated embeddings and wherein identifying the pattern includes using the concatenated embeddings.

The method 500 can further include receiving dynamic graph data and updating the source node embeddings and destination node embeddings based on the dynamic graph data. The method 500 can further include, wherein identifying the pattern includes using a trained decoder to classify based on the second groups, source node embeddings, destination node embeddings, dynamic graph data, and partition data. The method 500 can further include, wherein the partition data is user-specified and indicates a form of the pattern to be identified.

Further example applications are now provided.

In the case of source and destination nodes representing entities and locations, one could place surveillance/cameras at locations according to the pattern output and aligned with the metrics output from the system (e.g., 24-hour capture probability under resource scarcity (only so many cameras available)). Consider entities as animals in biological sciences, say in studying migration patterns of birds, organizational patterns of insects, wildebeest herds in Africa, etc. Embodiments are applicable to such circumstances.

Embodiments find application in social network technologies. Consider a social network platform that wants to predict interaction patterns between users and social network pages. The social network can leverage embodiments to predictively allocate resources to maintenance or tracking or advertisement of certain pages to certain user groups at certain times of day and/or when those users display other patterns (not restricted to time).

Suppose source nodes in the graph represent distribution hubs, and destination nodes represent terminal destinations for goods and edges represent the transfer of goods from a hub to a terminal destination. Major destinations might be cities with several terminal destinations. In that case, the patterns learned would relate to the quantity of goods at different places through time, and one might leverage the system to allocate drivers, packers, etc. to particular hubs and/or cities.

Suppose that source nodes represent entire companies and destination nodes are aggregations of different companies, say all of the ishares of electronically transferred funds (ETFs) and index funds. Further suppose the 'natural space' is the percent change of the ticker symbol's price and an edge between two tickers occurs whenever they are nearby within some window of time. The patterns learned would relate to companies influence on different index funds and ETFs. Such a system can leverage embodiments to learn company-sector (e.g., RDS-B to JETS) dependencies in the stock market for the purposes of initiating a new position when the expected price based on the pattern metrics is far off from the actual ticker.

In all of these cases, what is shared is a notion of taking an action on an entity in the graph based on the output of the machine learning system; while the action is data and use case dependent, applications of this system would always drive an action of some sort.

Artificial intelligence (AI) is a field concerned with developing decision-making systems to perform cognitive tasks that have traditionally required a living actor, such as a person. NNs are computational structures that are loosely modeled on biological neurons. Generally, NNs encode information (e.g., data or decision making) via weighted connections (e.g., synapses) between nodes (e.g., neurons). Modern NNs are foundational to many AI applications, such as text prediction.

Many NNs are represented as matrices of weights (sometimes called parameters) that correspond to the modeled connections. NNs operate by accepting data into a set of input neurons that often have many outgoing connections to other neurons. At each traversal between neurons, the corresponding weight modifies the input and is tested against a threshold at the destination neuron. If the weighted value exceeds the threshold, the value is again weighted, or transformed through a nonlinear function, and transmitted to another neuron further down the NN graph—if the threshold is not exceeded then, generally, the value is not transmitted to a down-graph neuron and the synaptic connection remains inactive. The process of weighting and testing continues until an output neuron is reached; the pattern and values of the output neurons constituting the result of the NN processing.

The optimal operation of most NNs relies on accurate weights. However, NN designers do not generally know which weights will work for a given application. NN designers typically choose a number of layers which may include a number of neurons, pooling, sampling operations, memory units (e.g., long-short term memory (LSTM), gated recurrent unit (GRU), or the like and specific connections between layers including circular connections. A training process, such as to train the TGNs 336A, 336B, decoder 338A, 338B or a portion thereof may be used to determine appropriate weights by selecting initial weights. The weights are iteratively improved via backpropagation or other algorithms established in the art.

In some examples, initial weights may be randomly selected. Training data is fed into the NN and results are compared to an objective function that provides an indication of error. The error indication is a measure of how wrong the NN's result is compared to an expected result. This error is then used to correct the weights. Over many iterations, the weights will collectively converge to encode an approximation of the function from the operational data to a range of values specific to the learning task into the NN. This process may be called an optimization of the objective function (e.g., a cost or loss function), whereby the cost or loss is minimized.

A gradient descent technique is often used to perform the objective function optimization. A gradient (e.g., partial derivative) is computed with respect to layer parameters (e.g., aspects of the weight) to provide a direction, and possibly a degree, of correction, but does not result in a single correction to set the weight to a "correct" value. That is, via several iterations, the weight will move towards the "correct," or operationally useful, value. In some implementations, the amount, or step size, of movement is fixed (e.g., the same from iteration to iteration). Small step sizes tend to take a long time to converge, whereas large step sizes may oscillate around the correct value or exhibit other undesirable behavior. Variable step sizes may be attempted to provide faster convergence without the downsides of large step sizes.

Backpropagation is a technique whereby training data is fed forward through the NN—here "forward" means that the data starts at the input neurons and follows the directed graph of neuron connections until the output neurons are reached—and the objective function is applied backwards through the NN to correct the synapse weights. At each step in the backpropagation process, the result of the previous step is used to correct a weight. Thus, the result of the output neuron correction is applied to a neuron that connects to the output neuron, and so forth until the input neurons are reached. Backpropagation has become a popular technique to train a variety of NNs. Any well-known optimization algorithm for back propagation may be used, such as stochastic gradient descent (SGD), Adam, etc.

Figure 6:
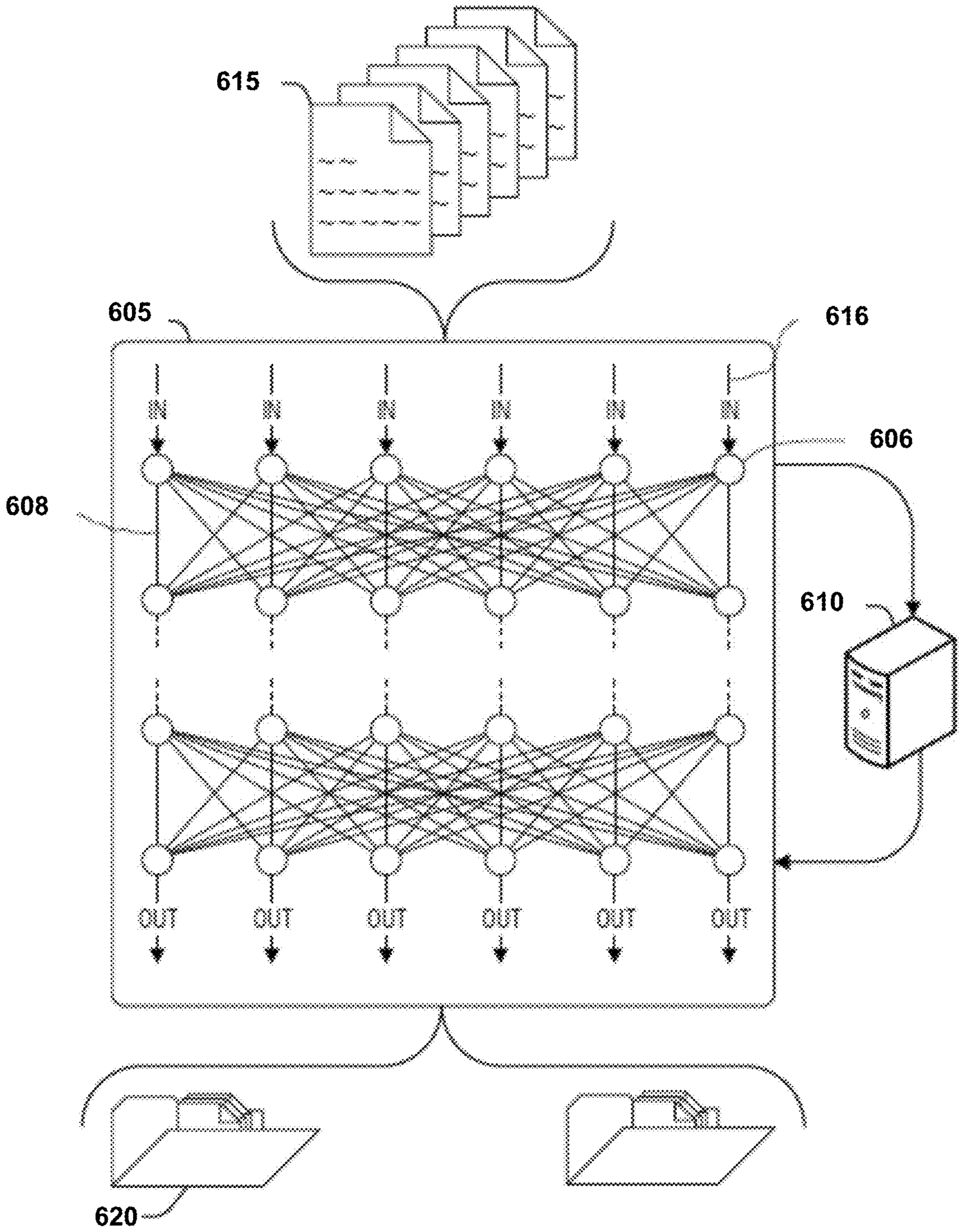
FIG. 6 is a block diagram of an example of an environment including a system for neural network training.

FIG. 6 is a block diagram of an example of an environment including a system for neural network training. The analysis operation 128, GNN 104, decoder 330, encoder 430, decoder 426, or the like can include an NN that can be trained in accord with FIG. 6. The resulting NN can predict entity interactions using interacting dynamic graphs. The system includes an artificial NN (ANN) 605 that is trained using a processing node 610. The processing node 610 may be a central processing unit (CPU), graphics processing unit (GPU), field programmable gate array (FPGA), digital signal processor (DSP), application specific integrated circuit (ASIC), or other processing circuitry. In an example, multiple processing nodes may be employed to train different layers of the ANN 605, or even different nodes 607 within layers. Thus, a set of processing nodes 610 is arranged to perform the training of the ANN 605.

The set of processing nodes 610 is arranged to receive a training set 615 for the ANN 605. The ANN 605 comprises a set of nodes 607 arranged in layers (illustrated as rows of nodes 607) and a set of inter-node weights 608 (e.g., parameters) between nodes in the set of nodes. In an example, the training set 615 is a subset of a complete training set. Here, the subset may enable processing nodes with limited storage resources to participate in training the ANN 605.

The training data may include multiple numerical values representative of a domain, such as a word, symbol, other part of speech, or the like. Each value of the training or input 617 to be classified after ANN 605 is trained, is provided to a corresponding node 607 in the first layer or input layer of ANN 605. The values propagate through the layers and are changed by the objective function.

As noted, the set of processing nodes is arranged to train the neural network to create a trained neural network. After the ANN is trained, data input into the ANN will produce valid classifications 620 (e.g., the input data 617 will be assigned into categories), for example. The training performed by the set of processing nodes 607 is iterative. In an example, each iteration of the training the ANN 605 is performed independently between layers of the ANN 605. Thus, two distinct layers may be processed in parallel by different members of the set of processing nodes. In an example, different layers of the ANN 605 are trained on different hardware. The members of different members of the set of processing nodes may be located in different packages, housings, computers, cloud-based resources, etc. In an example, each iteration of the training is performed independently between nodes in the set of nodes. This example is an additional parallelization whereby individual nodes 607 (e.g., neurons) are trained independently. In an example, the nodes are trained on different hardware.

Figure 7:
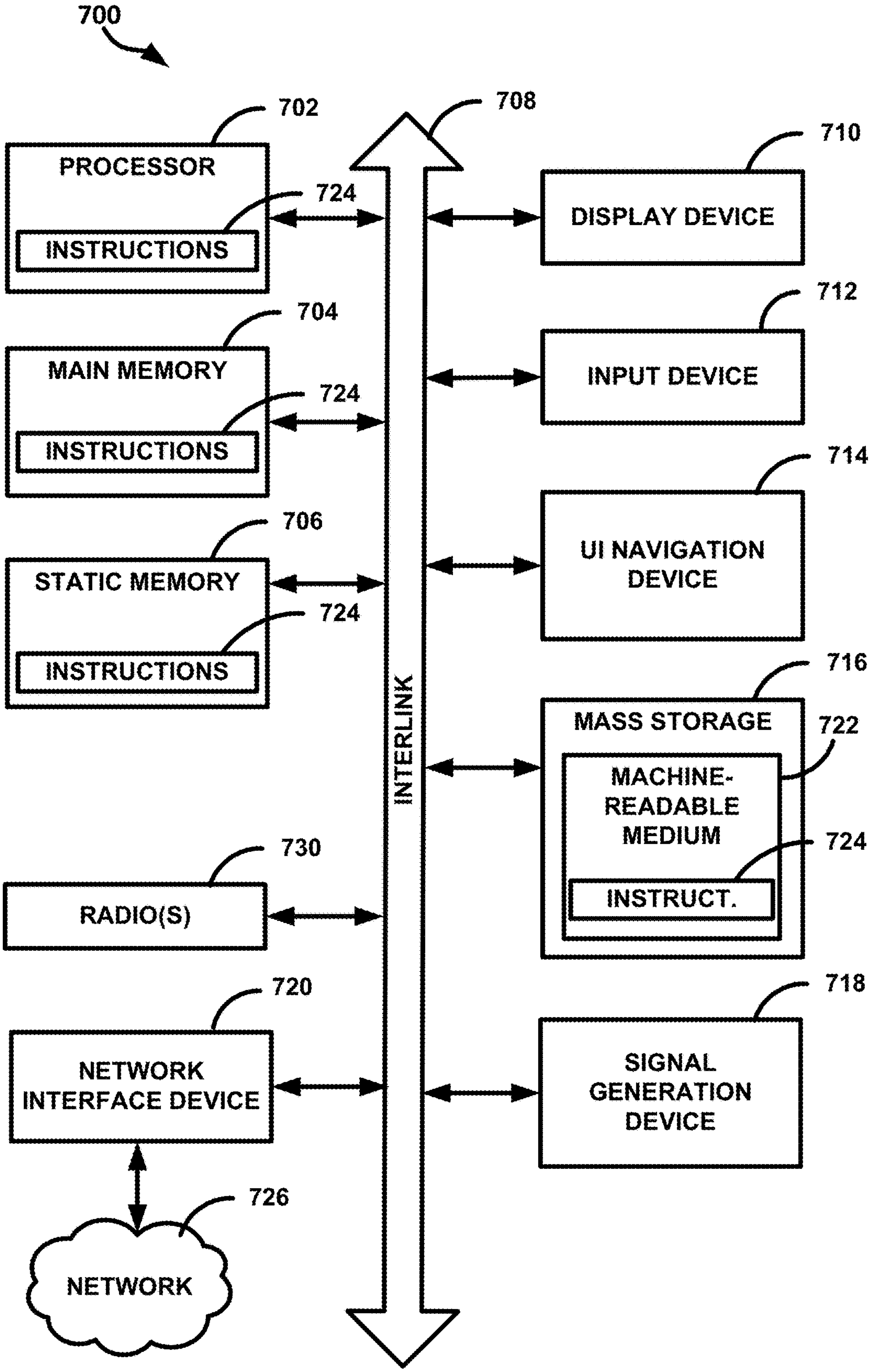
FIG. 7 illustrates, by way of example, a block diagram of an embodiment of a machine in the example form of a computer system within which instructions, for causing the machine to perform any one or more of the methodologies discussed herein, may be executed.

FIG. 7 illustrates, by way of example, a block diagram of an embodiment of a machine in the example form of a computer system 700 within which instructions, for causing the machine to perform any one or more of the methodologies discussed herein, may be executed. One or more of the GNN 104, clustering operation 130, dimensionality reduction 110, clustering technique 112, clustering technique 114, concatenate operation 122, analysis operation 128, decoder 330, TGN 404, decoder 426, method 500, or a component or operation thereof can be implemented using one or more components of the computer system 700. One or more of the GNN 104, clustering operation 130, dimensionality reduction 110, clustering technique 112, clustering technique 114, concatenate operation 122, analysis operation 128, decoder 330, TGN 404, decoder 426, method 500, or a component thereof can include one or more components of the computer system 700. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation device 714 (e.g., a mouse), a mass storage unit 716, a signal generation device 718 (e.g., a speaker), a network interface device 720, and a radio 730 such as Bluetooth, WWAN, WLAN, and NFC, permitting the application of security controls on such protocols.

The mass storage unit 716 includes a machine-readable medium 722 on which is stored one or more sets of instructions and data structures (e.g., software) 724 embodying or utilized by any one or more of the methodologies or functions described herein. The instructions 724 may also reside, completely or at least partially, within the main memory 704 and/or within the processor 702 during execution thereof by the computer system 700, the main memory 704 and the processor 702 also constituting machine-readable media.

While the machine-readable medium 722 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding, or carrying instructions for execution by the machine and that cause the machine to perform any one or more of the methodologies of the present invention, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 724 may further be transmitted or received over a communications network 726 using a transmission medium. The instructions 724 may be transmitted using the network interface device 720 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible media to facilitate communication of such software.

ADDITIONAL NOTES AND EXAMPLES

Example 1 includes a device comprising processing circuitry and a memory including instructions that, when executed by the processing circuitry, cause the processing circuitry to perform operations comprising receiving, from a graph neural network (GNN), source node embeddings and destination node embeddings, clustering the destination node embeddings generated by the GNN resulting in first groups of destination node embeddings, removing, from the destination node embeddings, embeddings from a noise group of the first groups resulting in signal destination node embeddings, clustering the signal destination node embeddings resulting in second groups of destination node embeddings, and identifying a pattern in the destination node embeddings and source node embeddings based on the second groups of destination node embeddings, the source node embeddings, and the destination node embeddings.

In Example 2, Example 1 can further include, wherein the operations further comprise reducing dimensionality of the destination node embeddings before clustering the destination node embeddings.

In Example 3, at least one of the Examples 1-2 can further include, wherein removing embeddings from the noise group of the first groups includes identifying a group of the first groups with an average deviation that satisfies a specified criterion.

In Example 4, at least one of Examples 1-3 can further include, wherein the operations further comprise concatenating respective source node embeddings and respective destination node embeddings resulting in concatenated embeddings and wherein identifying the pattern includes using the concatenated embeddings.

In Example 5, at least one of Examples 1~4 can further include, wherein the operations further comprise receiving dynamic graph data, and updating the source node embeddings and destination node embeddings based on the dynamic graph data.

In Example 6, Example 5 can further include, wherein identifying the pattern includes using a trained decoder to classify based on the second groups, source node embeddings, destination node embeddings, dynamic graph data, and partition data.

In Example 7, Example 6 can further include, wherein the partition data is user-specified and indicates a form of the pattern to be identified.

Example 8 includes a computer-implemented method that performs the operations of one of Examples 1-7.

Example 9 includes a non-transitory machine-readable medium including instructions that, when executed by a machine, cause the machine to perform operations comprising the operations of one of Examples 1-7.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A device comprising:

processing circuitry; and a memory including instructions that, when executed by the processing circuitry, cause the processing circuitry to perform operations comprising:

receiving, from a graph neural network (GNN), source node embeddings and destination node embeddings;

clustering the destination node embeddings generated by the GNN resulting in first groups of destination node embeddings;

identifying a noise group from the first groups by determining that an average deviation between embeddings in the noise group is below a threshold;

removing, from the destination node embeddings, embeddings from the noise group resulting in signal destination node embeddings having improved pattern coherence relative to the destination node embeddings;

clustering the signal destination node embeddings resulting in second groups of destination node embeddings; and identifying a pattern in the destination node embeddings and source node embeddings based on the second groups of destination node embeddings, the source node embeddings, and the destination node embeddings.

2. The device of claim 1, wherein the operations further comprise reducing dimensionality of the destination node embeddings before clustering the destination node embeddings.

3. The device of claim 1, wherein the operations further comprise concatenating respective source node embeddings and respective destination node embeddings resulting in concatenated embeddings and wherein identifying the pattern includes using the concatenated embeddings.

4. The device of claim 1, wherein the operations further comprise:

receiving dynamic graph data; and updating the source node embeddings and destination node embeddings based on the dynamic graph data.

5. The device of claim 4, wherein identifying the pattern includes using a trained decoder to classify based on the second groups, source node embeddings, destination node embeddings, dynamic graph data, and partition data.

6. The device of claim 5, wherein the partition data is user-specified and indicates a form of the pattern to be identified.

7. A computer-implemented method comprising:

receiving, from a graph neural network (GNN), source node embeddings and destination node embeddings;

clustering the destination node embeddings generated by the GNN resulting in first groups of destination node embeddings;

identifying a noise group from the first groups by determining that an average deviation between embeddings in the noise group is below a threshold;

removing, from the destination node embeddings, embeddings from the noise group resulting in signal destination node embeddings having improved pattern coherence relative to the destination node embeddings;

clustering the signal destination node embeddings resulting in second groups of destination node embeddings; and identifying a pattern in the destination node embeddings and source node embeddings based on the second groups of destination node embeddings, the source node embeddings, and the destination node embeddings.

8. The method of claim 7, further comprising reducing dimensionality of the destination node embeddings before clustering the destination node embeddings.

9. The method of claim 7, further comprising concatenating respective source node embeddings and respective destination node embeddings resulting in concatenated embeddings and wherein identifying the pattern includes using the concatenated embeddings.

10. The method of claim 7, further comprising:

receiving dynamic graph data; and updating the source node embeddings and destination node embeddings based on the dynamic graph data.

11. The method of claim 10, wherein identifying the pattern includes using a trained decoder to classify based on the second groups, source node embeddings, destination node embeddings, dynamic graph data, and partition data.

12. The method of claim 11, wherein the partition data is user-specified and indicates a form of the pattern to be identified.

13. A non-transitory machine-readable medium including instructions that, when executed by a machine, cause the machine to perform operations comprising:

receiving, from a graph neural network (GNN), source node embeddings and destination node embeddings;

clustering the destination node embeddings generated by the GNN resulting in first groups of destination node embeddings;

identifying a noise group from the first groups by determining that an average deviation between embeddings in the noise group is below a threshold;

removing, from the destination node embeddings, embeddings from the noise group resulting in signal destination node embeddings having improved pattern coherence relative to the destination node embeddings;

clustering the signal destination node embeddings resulting in second groups of destination node embeddings; and identifying a pattern in the destination node embeddings and source node embeddings based on the second groups of destination node embeddings, the source node embeddings, and the destination node embeddings.

14. The non-transitory machine-readable medium of claim 13, wherein the operations further comprise reducing dimensionality of the destination node embeddings before clustering the destination node embeddings.

15. The non-transitory machine-readable medium of claim 13, wherein the operations further comprise concatenating respective source node embeddings and respective destination node embeddings resulting in concatenated embeddings and wherein identifying the pattern includes using the concatenated embeddings.

16. The non-transitory machine-readable medium of claim 13, wherein the operations further comprise:

receiving dynamic graph data; and updating the source node embeddings and destination node embeddings based on the dynamic graph data.

17. The non-transitory machine-readable medium of claim 16, wherein identifying the pattern includes using a trained decoder to classify based on the second groups, source node embeddings, destination node embeddings, dynamic graph data, and partition data.

* * * * *